(12) United States Patent
Polinske et al.

(10) Patent No.: US 12,185,063 B2
(45) Date of Patent: Dec. 31, 2024

(54) APPARATUS AND METHOD TO INTEGRATE A WIRELESS CHARGER AND A HEARING ASSISTANCE DEVICE

(71) Applicant: Eargo, Inc., San Jose, CA (US)

(72) Inventors: Beau Polinske, Minneapolis, MN (US); Iain Butler, Pleasant Hill, CA (US)

(73) Assignee: Eargo, Inc., San Jose, CA (US)

( * ) Notice: Subject to any disclaimer, the term of this patent is extended or adjusted under 35 U.S.C. 154(b) by 359 days.

(21) Appl. No.: 17/854,619

(22) Filed: Jun. 30, 2022

(65) Prior Publication Data

US 2023/0007413 A1   Jan. 5, 2023

Related U.S. Application Data

(60) Provisional application No. 63/217,114, filed on Jun. 30, 2021.

(51) Int. Cl.
*H04R 25/00* (2006.01)
*H02J 50/10* (2016.01)

(52) U.S. Cl.
CPC ............ *H04R 25/656* (2013.01); *H02J 50/10* (2016.02); *H04R 25/50* (2013.01); *H04R 25/554* (2013.01); *H04R 25/65* (2013.01); *H04R 25/654* (2013.01); *H04R 25/658* (2013.01); *H04R 2225/025* (2013.01); *H04R 2225/31* (2013.01)

(58) Field of Classification Search
CPC .. H02J 7/02; H02J 50/10; H04R 25/00; H04R 25/50; H04R 25/554; H04R 25/558; H04R 25/65; H04R 25/654; H04R 25/656; H04R 25/658; H04R 2225/023; H04R 2225/025; H04R 2225/31
USPC .......................... 381/312, 321, 322, 328, 331
See application file for complete search history.

(56) References Cited

U.S. PATENT DOCUMENTS

| | | |
|---|---|---|
| 9,167,363 B2 | 10/2015 | Michel et al. |
| 9,432,781 B2 | 8/2016 | Herscher |
| 9,936,311 B2 | 4/2018 | Herscher |
| 10,097,936 B2 | 10/2018 | Barrett et al. |
| 10,284,977 B2 | 5/2019 | Shen et al. |
| 10,334,370 B2 | 6/2019 | Herscher |
| 10,771,883 B2 | 9/2020 | Aase et al. |
| 10,785,579 B2 | 9/2020 | Aase et al. |
| 2008/0205678 A1* | 8/2008 | Boguslavskij .......... H02J 50/15 381/312 |
| 2017/0127196 A1* | 5/2017 | Blum ................... H04R 25/554 |
| 2019/0268703 A1* | 8/2019 | Solum ...................... H02J 7/00 |
| 2019/0394575 A1* | 12/2019 | Ler ...................... H04R 1/1041 |
| 2022/0109941 A1* | 4/2022 | Shriner ................ H04R 1/1016 |

* cited by examiner

*Primary Examiner* — Harry S Hong
(74) *Attorney, Agent, or Firm* — Rutan & Tucker, LLP

(57) ABSTRACT

A wireless charger for a hearing assistance device can include a microphone and a wireless charging circuit. The microphone is configured to receive a wireless communication, including data, in an audio frequency range from a speaker built into a hearing assistance device. The hearing assistance device is configured to amplify sound into a user's ear. The wireless charging circuit of the wireless charger is configured to act as a wireless data transmitter to transmit wireless data in an ultrasonic frequency range, via a charging coil, to the hearing assistance device.

20 Claims, 6 Drawing Sheets

APPARATUS AND METHOD TO INTEGRATE A WIRELESS CHARGER AND A HEARING ASSISTANCE DEVICE

A portion of the disclosure of this patent application contains material that is subject to copyright protection. The copyright owner has no objection to the facsimile reproduction by anyone of the software engine and its modules, as it appears in the United States Patent & Trademark Office's patent file or records, but otherwise reserves all copyright rights whatsoever.

RELATED PATENT APPLICATIONS

This patent application claims priority to and benefit of U.S. Provisional Application No. 63/217,114, filed 30 Jun. 2021, entitled An Improved Hearing Assistance System, the disclosure of each of which is hereby expressly incorporated by reference herein in its entirety.

FIELD

Embodiments of the design provided herein generally relate to hearing assistance systems and methods. For example, embodiments of the design provided herein can relate to hearing aids.

BACKGROUND

Hearing aids work best if the user wants to wear the hearing aid and can use the hearing aid comfortably. Also, a person's hearing loss is different with each person which can lead to a diverse command set to cover all possibilities of users using the hearing aid.

SUMMARY

Provided herein in some embodiments is a hearing assistance system such as a hearing aid and/or ear bud.

In an embodiment, a wireless charger for a hearing assistance device can have the following components to cooperate with one or more hearing assistance devices. A wireless charger for a hearing assistance device can include a microphone and a wireless charging circuit. The microphone is configured to receive a wireless communication, including data, in an audio frequency range from a speaker built into a hearing assistance device. The hearing assistance device is configured to amplify sound into a user's ear. The wireless charging circuit of the wireless charger is configured to act as a wireless data transmitter to transmit wireless data in an ultrasonic frequency range, via a charging coil, to the hearing assistance device.

These and other features of the design provided herein can be better understood with reference to the drawings, description, and claims, all of which form the disclosure of this patent application.

DRAWINGS

The drawings refer to some embodiments of the design provided herein as well as with the additional documents filed with this document which form this provisional patent application.

FIG. 1 illustrates a diagram of an embodiment of an example housing/case of the wireless charger that is used to store a pair of hearing assistance devices when the hearing assistance devices are not in use.

FIG. 2 illustrates a diagram of an embodiment of an example wireless charging circuit of the wireless charger configured to generate and send a wireless charging signal in an ultrasonic frequency band, to be the wireless source of power, to charge rechargeable batteries of the hearing assistance device as well as ii) a transmitter for wireless communications in the same ultrasonic frequency range as the wireless charging signal.

Figure 1:
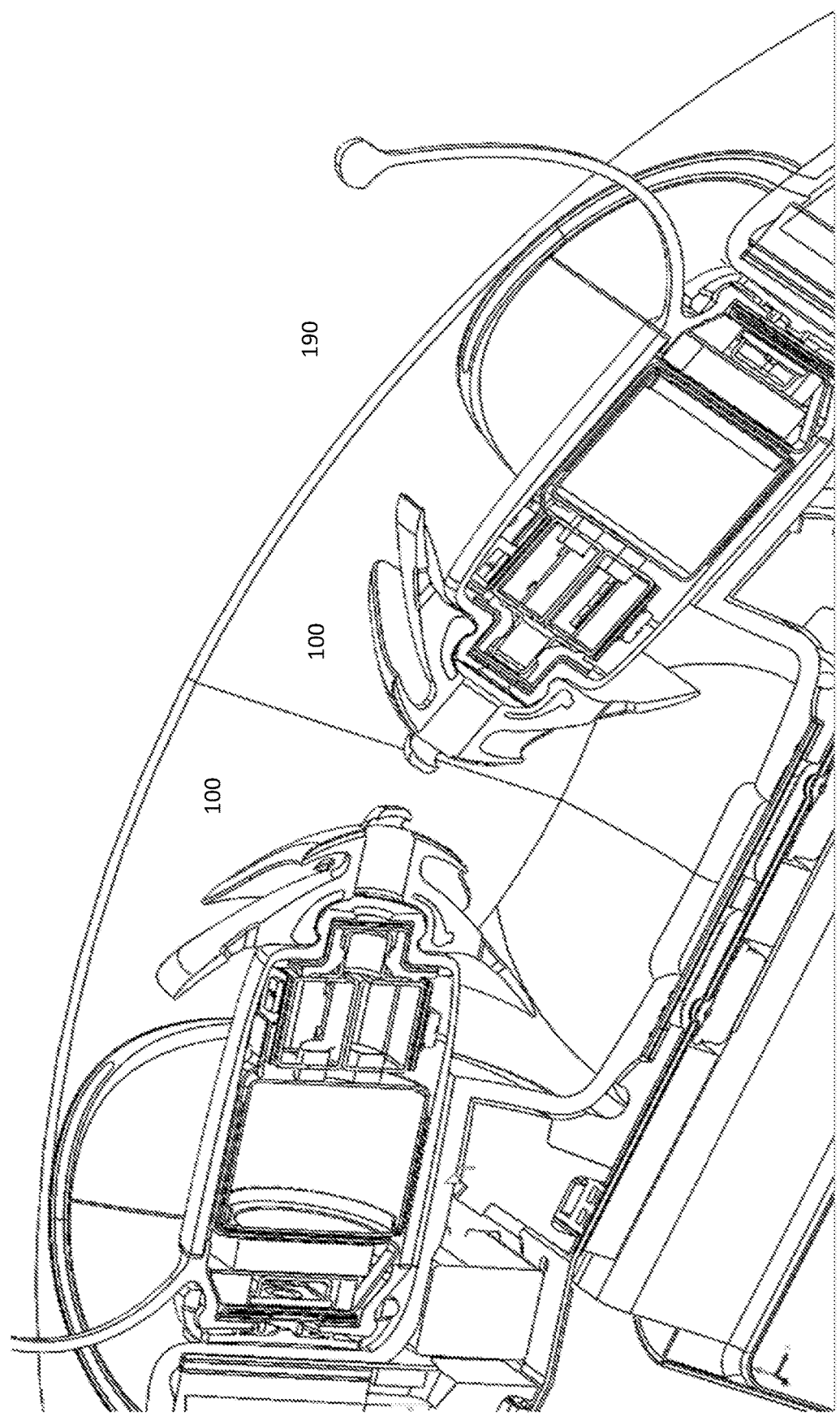

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as first hearing aid can be made. However, the specific numeric reference should not be interpreted as a literal sequential order but rather interpreted that the first hearing aid is different than a second hearing aid. Thus, the specific details set forth are merely exemplary. The specific details can be varied from and still be contemplated to be within the spirit and scope of the present design. The term coupled is defined as meaning connected either directly to the component or indirectly to the component through another component.

FIG. 1 illustrates a diagram of an embodiment of an example housing/case of the wireless charger that is used to store a pair of hearing assistance devices when the hearing assistance devices are not in use. The pair of hearing assistance devices 100 are resting inside the housing of the wireless charger 190.

A microphone of the wireless charger 190 can be configured to receive a wireless communication, including data, in the audio frequency range from an audio frequency speaker built into a hearing assistance device. The hearing assistance device 100 is configured to amplify sound to a user's ear. A wireless charging circuit of the wireless charger 190 can be configured to act as a wireless data transmitter in an ultrasonic frequency range, via a charging coil, to the hearing assistance device. The wireless charging circuit of the wireless charger 190, such as the Eargo 3.0 Charger™, for a hearing assistance device 100 (hearing aid, ear bud, etc., such as the Eargo 3.0 Hearing Instrument™) is used for multiple purposes including i) generating and sending wireless charging signals in an ultrasonic frequency band to hearing assistant devices as well as ii) a transmitter for wireless communications in a same ultrasonic frequency range as the wireless charging signals.

Figure 2:
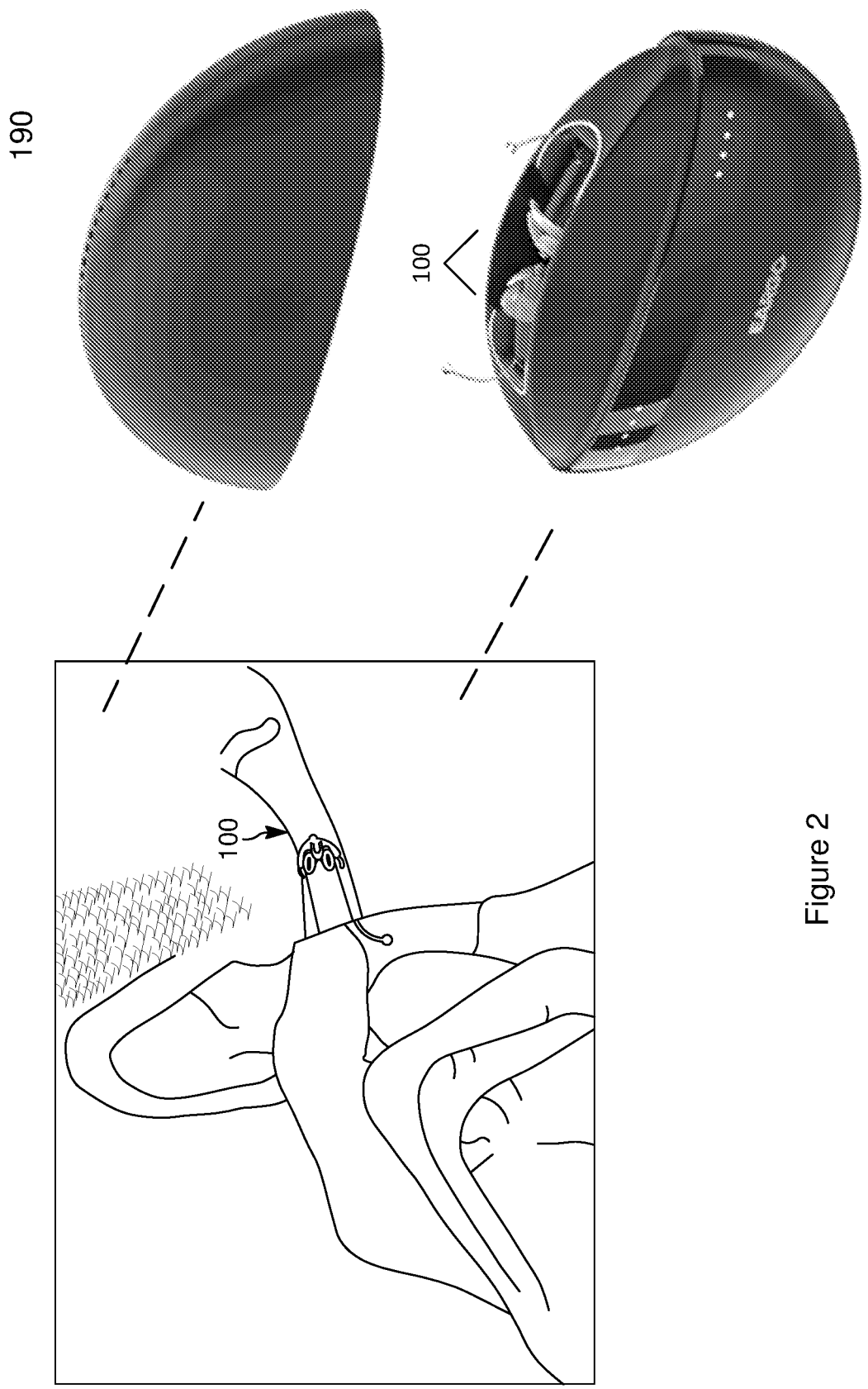

FIG. 2 illustrates a diagram of an embodiment of an example wireless charging circuit of the wireless charger configured to generate and send a wireless charging signal in an ultrasonic frequency band, to be the wireless source of power, to charge rechargeable batteries of the hearing assistance device as well as ii) a transmitter for wireless communications in the same ultrasonic frequency range as the wireless charging signal. The hearing assistance devices 100 and the wireless charger 190 integrate multiple uses into the charging circuit from the wireless charger 190 and the audio circuit and speaker from the hearing assistance device. By adding software and firmware and a few components, this design integrates multiple additional uses into components in the hearing assistance device 100 and the wireless charger 190 to provide additional functionality between these two devices. One additional use is a communication exchange system between the wireless charger 190 and hearing assistance device 100 using two or more different sound frequency bands. For example, the wireless charger 190 can be used to provide communication to the hearing assistance device 100 in a wireless ultrasonic frequency band and then the hearing assistance device 100 can provide feedback and other information in the audio frequency through beeps and other sounds to the microphone port of the wireless charger 190. A second use is the components in the wireless charger 190 are used as the wireless source of power to charge the batteries of the hearing assistance device 100 using a same ultrasound frequency. A third use is the components in the hearing assistance device 100 is to amplify and clarify sound in the audio frequency range that a user is hearing in their ear. A fourth additional use is the memory, firmware, and software components in the hearing assistance device 100 collect data in each hearing assistance device 100 and then send this data wirelessly over to the wireless charger 190. A fourth additional use is the housing that contains the wireless charger 190 circuitry (e.g., the charging coil, etc.) can also be used to store each hearing assistance device. The wireless charger 190 acts as a portable storage container for the hearing assistance devices 100.

The hearing assistance device 100 is configured to use the audio frequency speaker built into the hearing assistance device 100 as its wireless transmitter to communicate with the wireless charger 190 so that the hearing assistance device 100 does not need to have a Wi-Fi circuit and antenna. Thus, the hearing assistance device 100 is configured to have dimensions which allows the hearing assistance device 100 to fit and be implemented as at least one of i) an in-the-ear-canal hearing aid and ii) an ear bud; rather than, a behind-the-ear hearing aid. Note, the multiple uses of components within the hearing assistance device 100 keeps the size of the hearing assistance device 100 small, whilst allowing the hearing assistance device 100 to be rechargeable and do communications.

Typically, a user will use one or more hearing assistance devices 100 and insert the hearing assistance device 100 into their ear canal. The hearing assistance device, reuses its wireless charging circuit connected to the rechargeable batteries as a receiver for wireless communications and its audio amplifier as a transmitter for wireless communications with the wireless charger 190, which achieves a smaller form factor/size. Thus, the hearing assistance device 100 as a hearing aid can fit inside a greater amount of human ear canals in the human population. Thus, separate charging and separate communication circuits could be used but the form factor size of the device would need to be bigger to fit these extra components.

Also, reusing the same components i) decreases the amount of things that can break, ii) decreases costs to manufacture these devices, iii) improves/shortens manufacturing time, as well as iv) increases reliability by, for example, removing the vulnerable exterior electrical contact found on previous hearing assistance devices 100.

Thus, the design uses wireless charging as well as wireless communications, including sending commands, firmware updates, receiving data and feedback from the hearing assistance device, etc. between the wireless charger 190 and the hearing assistance device. Thus, no need exists to have an electrical contact on an exterior of the hearing assistance device 100 (See FIG. 4), which would be exposed to be attacked by the corrosive environment (sweat, etc.) in the ear canal. The wireless communications keeps wax from interfering with the communications if there was an external data contact. Thus, the device actually gets better communications and more reliable communication of information via wireless communications instead of communications of firmware updates via an external contact.

Note, an example hearing assistance device 100 can have dimensions which allow the hearing assistance device 100 to fit and be implemented as an in-the-ear-canal hearing aid and/or an ear bud.

Figure 3:
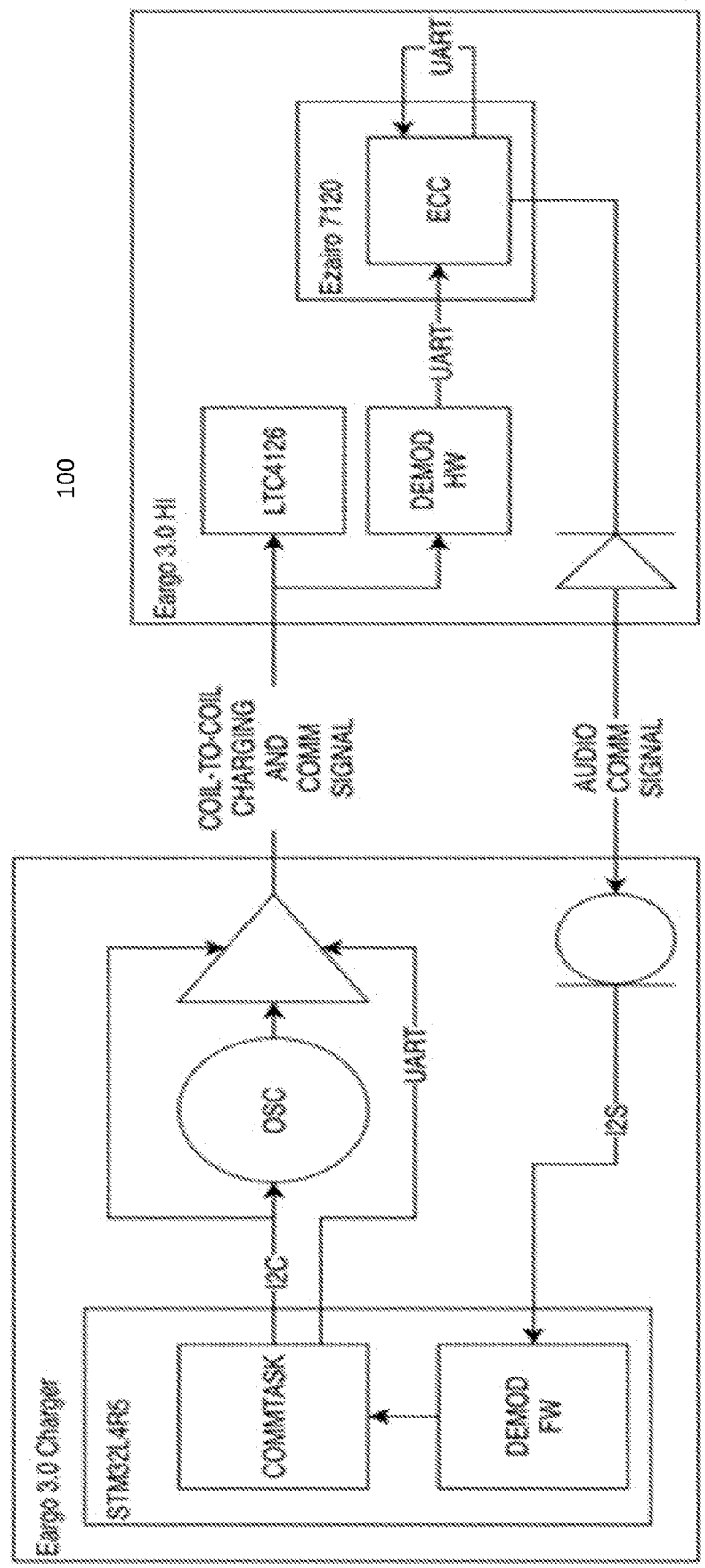
FIG. 3 illustrates a diagram of an embodiment of an example wireless charging circuit of the wireless charger configured to cooperate with an audio circuit of the hearing assistance device to communicate and exchange data with the wireless charger with two different frequency bands.

FIG. 3 illustrates a diagram of an embodiment of an example wireless charging circuit of the wireless charger configured to cooperate with an audio circuit of the hearing assistance device to communicate and exchange data with the wireless charger with two different frequency bands.

The Wireless Charger

The wireless charging circuit of the wireless charger 190 can generate and send the wireless data in the ultrasonic frequency range, including sending firmware updates, as well as, have a microphone to receive data from the speaker built into the hearing assistance device, which eliminates a need to have an external electrical contact on an exterior of the hearing assistance device 100 to transfer the data or the firmware updates. The wireless charger 190 is equipped with a microprocessor, such as an STM32L4R5 microprocessor, which is connected to an oscillator and a digital-to-analog converter (DAC) by an I2C bus to control the frequency and amplitude of the charging signal. The charging signal, via amplitude modulation, can be used as a carrier wave for the wireless data transmissions in the ultrasonic frequency range. The wireless charger 190 is configured to transfer energy to the hearing instrument/assistance device over a 6 to 13 MHz contactless charging link. The microprocessor in the wireless charger 190 connects to an oscillator, which is the same oscillator that the wireless charger 190 uses to transfer power. The wireless carrier frequency can be, for example, 13 megahertz. The oscillator connects to a class D amplifier that the wireless charger 190 uses to drive the charging coil to be the wireless source of power as well as a carrier wave for wireless data transmission to the hearing assistance device. The oscillator connects to the class D amplifier to drive the charging coil to just a constant 13 megahertz to transfer power. The data in the communication signal can be added/modulated onto the carrier frequency wave to convey the information wirelessly. The wireless data transmitted can be modulated, as an amplitude modulation signal, across the charging signal wave. The wireless communications have a modulator-demodulator module in the input signal path of the wireless charging circuit in the hearing assistance device; and likewise, a modulator-demodulator module exists in the wireless charger 190. Alternatively, data in the communication signal can be added by simply having the signal turned on and off to convey the information wirelessly.

Again, the communications signal can be modulated, as an amplitude modulation signal, across the charge signal wave. Thus, when the charger wants to transmit a start bit, a logical one, or a logical zero, the modulator can turn signals on or shut off. The class D amplifier can have one side high and the opposite side will be low. During charging, this arrangement will normally switch at 13 megahertz but for communication, the wireless charger 190 can just stop switching.

The Eargo Charger Comm (ECC) module is configured to enable bidirectional communication between the wireless charger 190 and a hearing instrument/assistance device (HI) over a contactless charging system.

Before communications a wireless data transmission occurs, the modulator-demodulator module can use a unique starting pattern before transmission of the wireless data to help the reliability of the wireless transmission to eliminate environmental noise in the same frequency band, which could be errantly interrupted as a data being intentionally transferred and/or a command to perform a corresponding operation in the hearing assistance device. Thus, a modulator in the wireless charger 190 is configured to use a unique starting pattern before a wireless transmission of the data communications occurs to prevent environmental noise in the ultrasonic frequency range from being interpreted as the wireless data. The ECC Init Ack Delay parameter defines the time from receiving the initialization command, or signal, to when the device acknowledges the start of an ECC session. The purpose for this delay is to separate in time the normal audio output of a hearing assistance device 100 from the acknowledgment. This helps the demodulator to detect the start of the acknowledgment.

Note, in the packet protocol we have a preamble/unique starting pattern such as 1010 pretend bits before transmission of the data. If that preamble/unique starting pattern is not detected the signal processing can stop right there because although this signal is within the correct frequency band it's not addressed with the preamble; and thus, not a valid communications signal to be sent to the microprocessor later downstream.

The charger modulates the charging signal and data communications signal to the hearing instrument at 28.8 K Baud. Thus, the transmit line of a universal asynchronous receiver transmitter (UART) from the charger microprocessor (e.g., STM32L4R5 microprocessor) modulates the charging signal to create an inverted amplitude shift keyed (ASK) signal which represents the UART communication.

The UART in the hearing assistance device 100 and/or in the wireless charger 190 can be a physical circuit in a microcontroller. The UART's main purpose can be to transmit and receive data, such as serial data. The universal receiver transmitter is configured to start interpreting what is the message/meaning/intelligence in the communicated information signal that is being sent across the charge signal. The UART also can be configured to support communications in the audio frequency band.

The Hearing Assistance Device

The audio amplifier circuit in the hearing assistance device 100 is used for multiple purposes including i) as a transmitter for wireless communications to a wireless charger 190 in the audio frequency range through the audio amplifier circuit as well as ii) an audio amplifier circuit for the hearing assistance device 100 to transmit sound to a user's ear. The design integrates multiple purposes/uses into 1) the charging circuit of the wireless charger 190 (charging power source and the transmitter for the wireless communications) as well as 2) the audio amplifier of the hearing assistance device 100 to amplify sound for the user's ear and act as a transmitter of wireless communications to the microphone of the wireless charger 190.

In the hearing assistance device, during wireless communications, the modulator-demodulator is in the input signal path of the wireless charging circuit. Thus, the input of the charging chip (e.g., LTC4126 charging chip) in the wireless charging circuit located in the hearing assistance device 100 is also tied to an analog demodulation circuit which reconstructs the UART signal and inputs it to the UART RX pin on the signal processor (e.g., Ezairo 7120 signal processor) within the hearing instrument/assistance device. The analog demodulation circuit has a diode rectifier. Note, the modulation can be the process of influencing data information on the carrier in the wireless charger 190, while demodulation in the hearing assistance device 100 can be the recovery of the original information from a carrier wave at the distant end. In this example, amplitude modulation is being used. Thus, the circuit sends the received signal down to the demodulator, where the circuit has a diode rectifier inside, that extracts the communicated information signal off of the charging signals acting as the carrier wave carrying both the charging and the communications. The diode aids to detect the communicated information signal, and then the circuit supplies that communication signal over to the UART, which starts interpreting what is the message/meaning/intelligence in the communicated information signal that is being sent across the charge signal. The firmware is set up in the UART so that there is no significantly different processing that the design has to do to determine logical ones and zeros as this arrangement does this decoding automatically. Thus, the information used for communications including commands can be determined from the received charge frequency signal by routing the design in this manner.

In an embodiment, the analog demodulation circuit on amplitude modulation from the wireless charger 190 has a diode rectifier in the hearing assistance device 100 that extracts the communicated information signal off of the charging signals acting as the carrier wave. The demodulator UART in the hearing assistance device 100 receives and decodes these communications and commands that were, for example, amplitude modulated on the charge signal and then sends the feedback and/or response back over the audio COM signal to the microphone of the wireless charger 190.

Note, the UART in the hearing assistance device 100 can be a physical circuit in a microcontroller. The UART transmits and receives data, such as serial data. The UART can be configured to support communications in the audio frequency band, such as sub-bass (40 Hz) to near ultrasonic (18,000 Hz) as well as ultrasonic frequencies above human hearing 20,000 hertz up to megahertz and those frequencies typically used for wireless charging. The asynchronous serial communication can be a data format and transmission speeds that sends data bits one by one, from the least significant to the most significant, framed by start and stop bits so that precise timing is handled by the communication channel. The transmit Baud Rate parameter sets the transmit UART baud rate through the hearing assistance device 100 audio output. The parameter is limited to standard UART baud rates in software. The receive Baud Rate parameter sets the receive UART baud rate through the charging signal. The parameter is limited to standard UART baud rates in software.

Again, the wireless charger 190 can send communications and/or commands from the wireless charger 190 to the hearing aid, and can update its firmware. The wireless charger 190 can send for example, mostly parameter writes, parameter reads, data logging, an initiate so data logging is instigate data logging write, a command to read, whatever the prom data, etc. For example, the wireless charger 190 communications can request battery status from the hearing instrument. The hearing assistance device 100 receives and decodes these communications and commands that were amplitude modulated on the charge signal and then responds and sends the feedback and/or response back over the audio COM signal to the microphone of the wireless charger 190. For example, the hearing instrument communicates in the audio frequency band through its speaker information such as feedback information that was collected in the hearing aid on user interaction and other recorded metrics. Alternatively, the Charger Comm (ECC) module in the hearing assistance device 100 can merely respond to the commands by taking an action, such as the hearing assistance device 100 entering a specific operating mode to go to sleep, eliminating squeal feedback, etc.

The wireless charger 190 provides a reliable way to actually change all of the firmware in, for example, the digital signal processor of the Charger Comm (ECC) module in the hearing assistance device 100 whenever we want. For example, the wireless charger 190 can transmit a command and data to install new firmware on the carrier wave 1) during charging, after the hearing assistance device 100 is in operation, 2) while the hearing assistance device 100 is in operation and installed in a user's ear, 3) while the hearing assistance device 100 is in operation and being stored in a housing of the wireless charger 190, and 4) any combination of these. Using the higher frequency, ultrasonic frequency, of the charging circuit significantly increases the data rate at which the information can be communicated to the hearing assistance device. Note, this design also again gives an easy and reliable way to actually grab the data logs from the memories of the hearing assistance device 100 whenever we want 1) during charging, after the hearing aid is in operation, 2) while in the hearing aid is installed in a user's ear, after the hearing aid is in operation, etc.

Next, the return wireless communications signal is sent from the speaker audio output of the hearing instrument/assistance device and received by a microphone within the wireless charger 190. The ECC module outputs data on the UART TX transmit line and loops it back to the signal processor (e.g., Ezairo 7120 signal processor). An edge triggered interrupt inverted amplitude shift keyed signal modulates an audio tone out of the hearing instrument/assistance device by enabling and disabling the audio output of the signal processor (0=on; 1=off). This audio signal is received by the charger microphone and passed to the charger microcontroller (e.g., STM32L4R5 microcontroller) over an I2S bus. The digitized signal is demodulated to reconstruct the data sent by the hearing instrument/assistance device. Note, the I2S (Inter-IC Sound) bus, can be an electrical serial bus interface standard used for connecting digital audio devices together. The I2S bus can be used to communicate audio data between these devices. Note, the data in the audio frequency range sent through the speaker to the charger can be formatted with two size bytes, I2C payload, and a two byte CRC at the end.

Next, the power supply of the charge circuit in the hearing assistance device 100 is tied to the output of the UART. The charging chip (e.g., LTC4126 charging chip) is in charge of controlling the charging of the battery. During charging of the batteries in the hearing assistance devices 100, the signal from the charger is accepted by the charging chip for charging the Lithium Ion battery in the hearing instrument/assistance device.

Firmware Overview

There can be a set of commands on the signal processor in the hearing assistance device 100 to interpret all of those commands being sent to the wireless transmission. The signal processor in the hearing assistance device 100 using Open Framework FW relies on an I2C bus for bidirectional communication with the device. These I2C commands are processed in the I2C control module. The Open Framework FW automatically keeps track of the memory locations of the parameters for all modules through the I2C control module; and thus, ensures other memory locations are not corrupted attempting parameter changes. This configuration allows the connecting software to only have to keep track of the module numbers and the parameter offsets within each module rather than the memory locations of each parameter.

The hearing assistance device 100 can use the UART bus to communicate rather than the I2C bus because of the contactless nature of the device. The Charger Comm (ECC) module was developed to interface with the I2C control module using the UART bus. The ECC is designed to wrap the two byte UART size and a two byte cyclic redundancy check (CRC) around the I2C payload which is normally sent to the I2C control module over the I2C bus minus the I2C address byte. Each I2C payload is sent with a command byte (CMD), and RX data if the command requires it.

The UART size is set to the number of bytes received after the UART size bytes. For example, UART size will equal [e.g., 0x00 0x03] if there is only a CMD byte necessary (e.g., 1 byte for CMD+2 bytes for CRC).

The ECC EEPROM Write command is designed to update firmware on the signal processor in the hearing assistance device 100 as efficiently as possible by having the capability to write an entire page in one command. The command requires a 3 byte starting address ("Address"), a payload size ("Size"), and the payload to be written to EEPROM ("Payload"). The on-board EEPROM in the signal processor can be, for example, 2 Mb. The maximum payload size of the ECC EEPROM Write command can be 256 bytes which matches the page size of the on-board EEPROM of the signal processor.

For example, if the programmer attempted the following write to EEPROM the following steps may occur.

The first step in the process is to write to the non-volatile memory (NVM) of the signal processor on the hearing assistance device 100 by sending an enable command to the onboard EEPROM. The ECC EEPROM Open command is implemented as a separate command so it does not have to be sent before every write attempt. This reduces the time it takes to update firmware on the hearing assistance device 100 by leaving the write enabled on the EEPROM for an entire firmware update rather than opening it every write cycle.

Next, in an embodiment, the cyclic redundancy check can have a seed value. The checker divides the whole packet by a seed number and the remainder is this CRC. The cyclic redundancy check can be a CRC-CCITT with a OxFFFF seed value. This CRC checker is also built into the signal processor. The two byte CRC is calculated across the UART size bytes, the CMD byte and the RX data. The entire packet (UART size, I2C Payload, two byte CRC) is run through the CRC calculation upon reception. The CRC could be applied across merely the unique starting pattern as well. In an embodiment, any non-zero result indicates at least one bit is in error in the packet.

Figure 4:
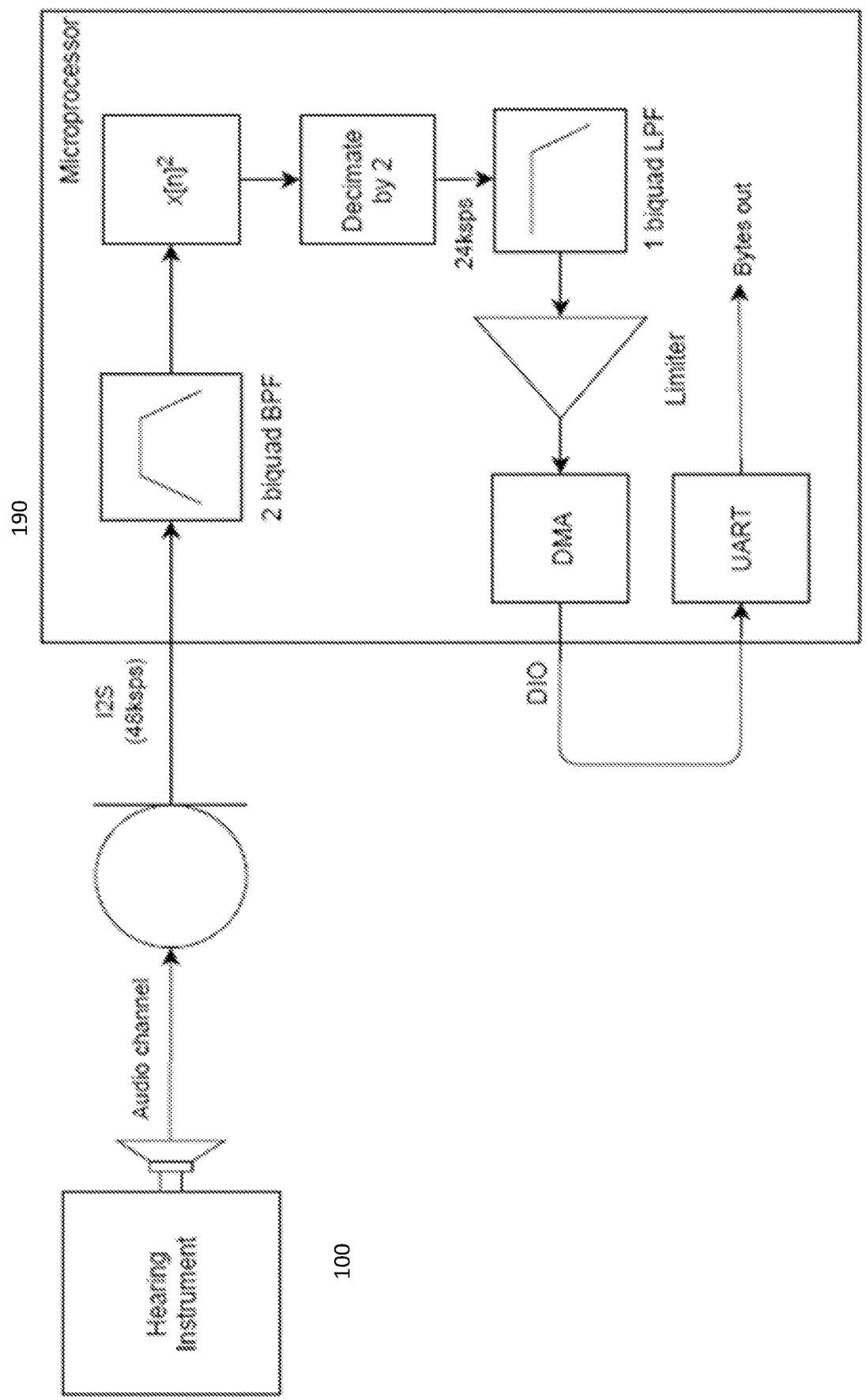
FIG. 4 illustrates a diagram of an embodiment of an example of a UART decoder in the hearing assistance device to receive and process the wireless data from the wireless charger.

FIG. 4 illustrates a diagram of an embodiment of an example of a UART decoder in the hearing assistance device to receive and process the wireless data from the wireless charger. The hearing assistance device 100 can receive and process the wireless signal from the wireless charger 190. The signal can come into the microphone from the audio channel at, for example, 48 Kilo samples per second (ksps). The example device uses a biquad bandpass filter (e.g., 2 biquad BPF). The device uses the band pass filter to set the range of what frequency range of signal the system wants to get through and filter out erroneous signals from the comms signal. The bandpass filter filters out audible noise to isolate the comms channel. Note, the biquad filter block can independently filter each channel of the input signal with the specified biquadratic infinite impulse response filter. The example biquad filter block can specify the filter coefficients. The biquad filter helps to isolate and slice off the power charging signal from the communication signal received from the wireless charger 190 so that the example UART can get the logical ones and zeros from the demodulated information off the carrier wave.

The example biquad filter block can use a signal with, for example, 15.5 or 18 kHz to isolate to that channel. The example device passes the signal from the bandpass filter to an absolute value block (e.g., $x[n]^2$). The signal from the wireless charger 190 was transmitted with amplitude modulation for the bytes of information onto the transmitted signal with both the positive and negative swings on the wave. The circuitry then applies a squared so that both sides of the wireless transmitted signal can be decoded and understood in order to improve the value of the bit detection in the content payload. The squared function applied can ensure that the wavelength signal being received is at least a threshold amount above the noise floor to ensure that the current audio signal being processed is not a spurious audio signal generated by the environment. So the example device can use both the positive and negative swings on the wave to figure out information by taking the peak to peak value. Whether the information from the amplitude modulation is a logical one or a logical zero with the absolute value, the device can determine what that information is on both swings of the wave. Note, the example device could also use a half wave to just knock out all negative, but in this particular case, the example device does use a full wave envelope. Using both the positive and negative swings of the transmitted signal results in being much more power efficient and longer battery life.

Next, the device uses the bandpass filter and obtains the filtered amplitude modulation signal. The example device uses a decimate block (e.g., Decimate by 2). Thus, the microphone data comes in at 48 k samples that were narrowly band pass filtered and now this block decimates the signal to 24 K samples a second. This function can be performed by an internal Cortex 3 m processor. Now, the example device can apply the low pass filter (e.g., biquad LPF) to reconstruct the baseband.

The example design can use a biquad low pass filter, apply a Gaussian filtered wave and detect those edges, to determine a limiter. The limiter (e.g., Limiter) helps determine the threshold that's the design's limit threshold and reconstruct the waveform. Next, the example device uses a DMA Controller (e.g., DMA). The DMA Controller can be a hardware device that allows I/O devices to directly access memory with less participation from the processor. The example device uses a DMA to feed the signal back into the universal asynchronous receiver-transmitter (UART). In the microprocessor then the system gets an interrupt that says hey a byte has been detected. In one example, all the timing of the decoding and all of the ones and zeros determination is actually done by the Cortex m3 processor.

Note, the example design doesn't have to use clock cycles to try to get the logical ones and logical zero bytes out. Thus, the example design doesn't have to have some kind of clock to figure out how to decode.

Figure 5:
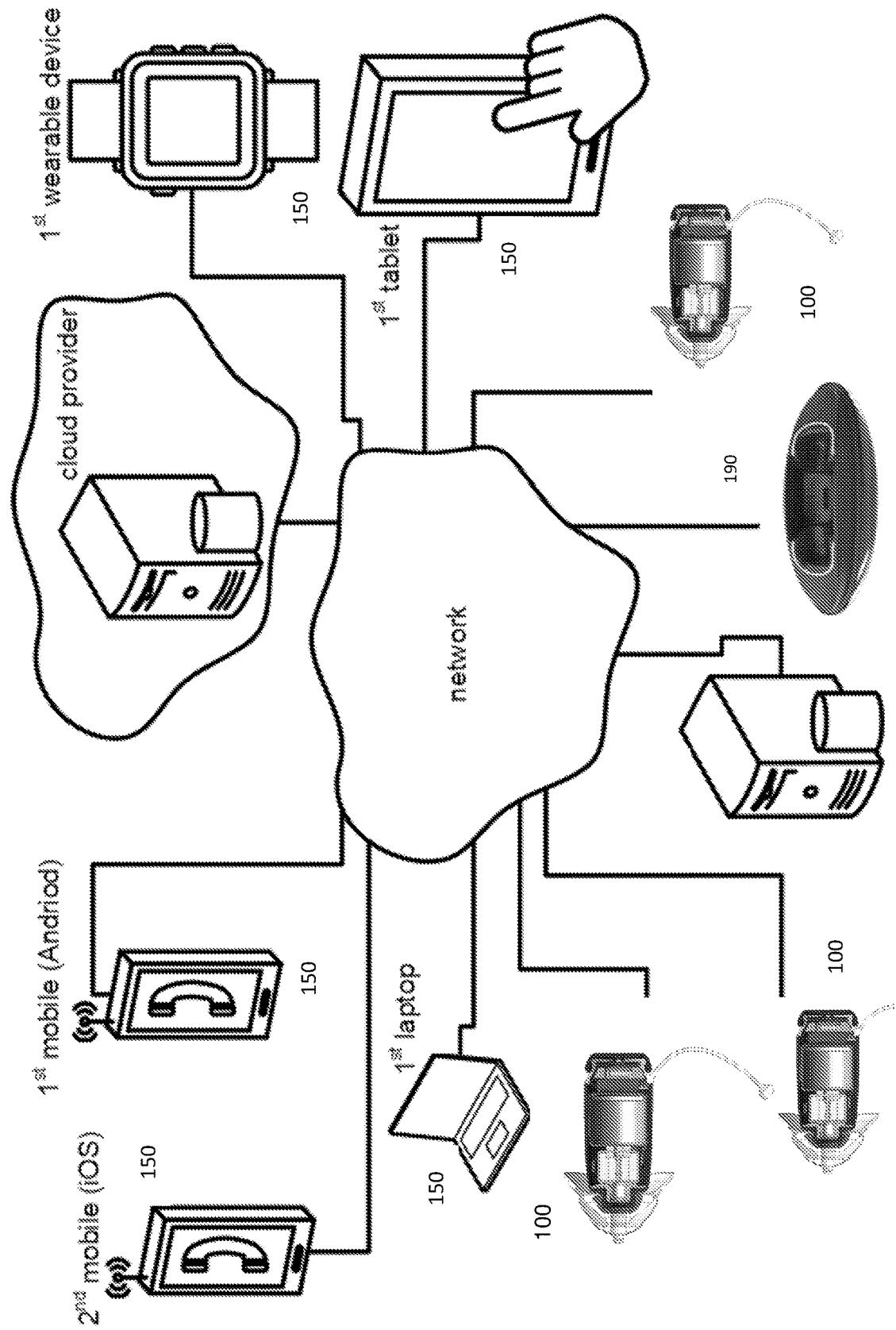
FIG. 5 illustrates a diagram of an embodiment of an example of the hearing assistance device to communicate data to the wireless charger in the audio frequency band through its speaker information, such as feedback information that was collected by and/or in the hearing assistance device on user interaction and other recorded metrics.

FIG. 5 illustrates a diagram of an embodiment of an example of the hearing assistance device to communicate data to the wireless charger in the audio frequency band through its speaker information, such as feedback information that was collected by and/or in the hearing assistance device on user interaction and other recorded metrics. The wireless charger 190 has a Wi-Fi communication circuit to report the data including the metrics (e.g., parameters, user interaction, and other recorded metrics) from the hearing assistance device 100 via Wi-Fi over a wide area network (e.g., the Internet) to a cloud platform.

Again, this cooperation between the hearing assistance device 100 and the wireless charger 190 gives an easy and reliable way to actually grab the data logs from the memories of the hearing assistance device 100 whenever the system wants 1) during charging, after the hearing assistance device 100 is in operation, 2) while the hearing assistance device 100 is in operation and installed in a user's ear, 3) while the hearing assistance device 100 is in operation and being stored in a housing of the wireless charger 190, and 4) any combination of these.

Figure 6:
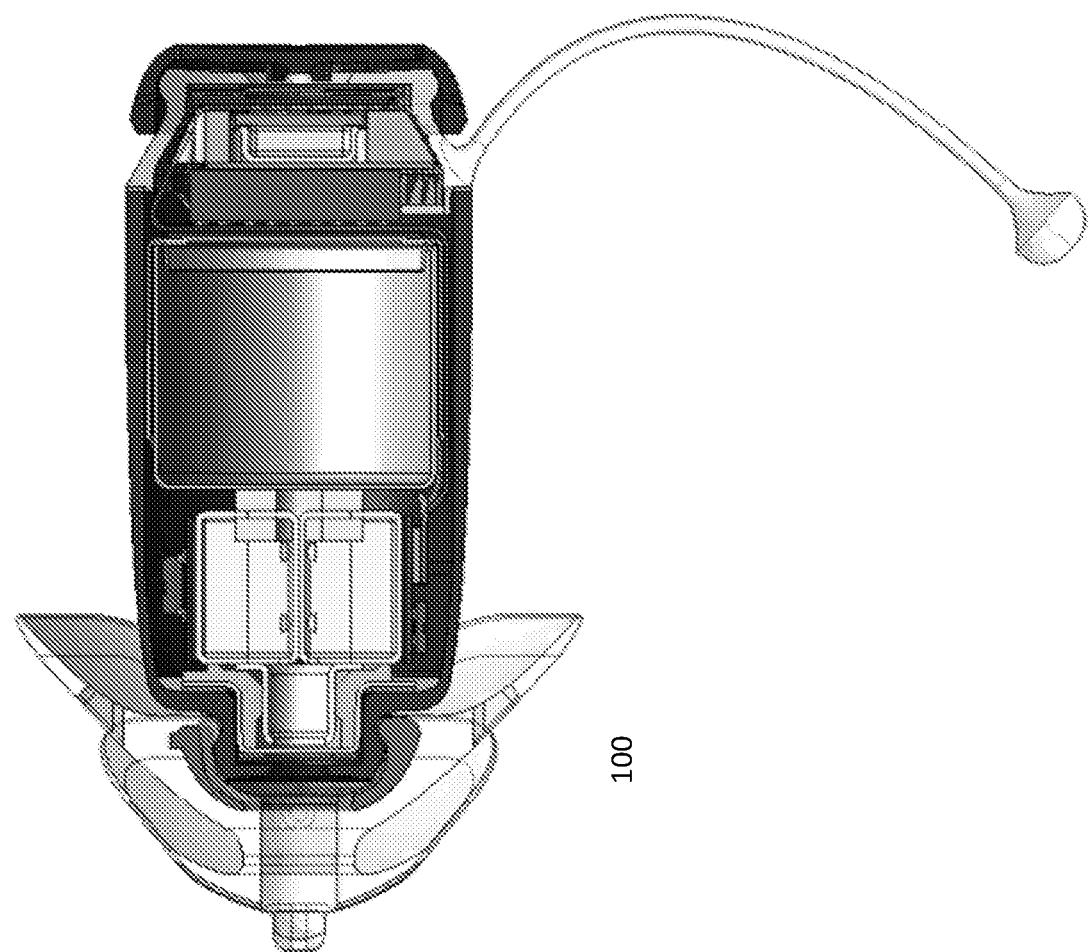
FIG. 6 illustrates an embodiment of an example front on view as well as a side diagram of an embodiment of an example hearing assistance device.
Figure 6:
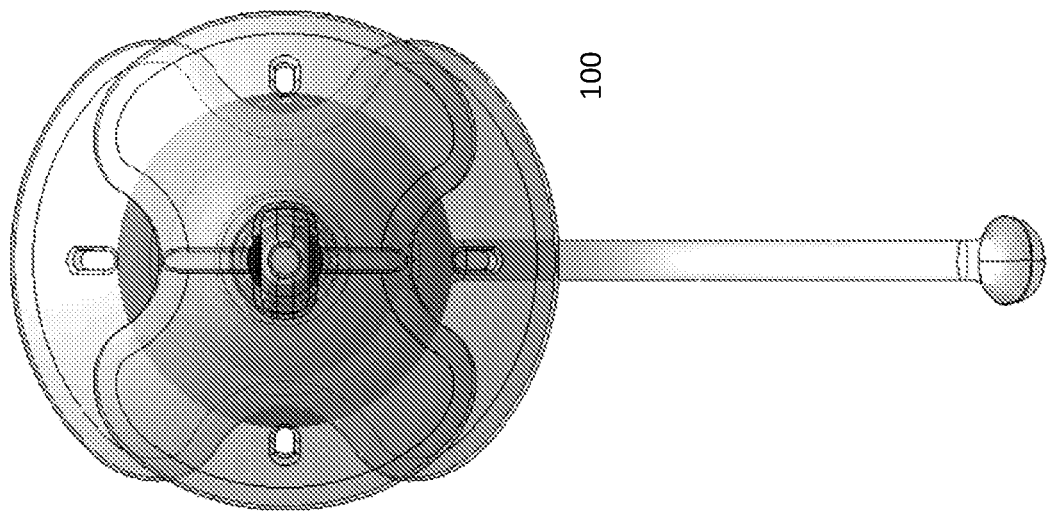

FIG. 6 illustrates an embodiment of an example front on view as well as a side diagram of an embodiment of an example hearing assistance device. The wireless charger 190 is configured to be the power source for charging the batteries of the hearing aid as well as the provider to communicate, in general, as well as update firmware wirelessly with the hearing assistance device. This eliminates a need to have any external electrical contact on an exterior of the hearing assistance device. The wireless charging circuit of the wireless charger 190 is configured to generate and send wireless communications, including sending commands, firmware updates, etc. and then to receive, via a microphone, data and feedback from the hearing assistance device, which eliminates a need to have an external electrical contact on an exterior of the hearing assistance device.

Again, FIG. 5 illustrates a number of electronic systems, including the hearing assistance devices 150, communicating with each other in a network environment in accordance with some embodiments. The hearing assistance devices 150 as well as the wireless charger 190 can cooperate other components in those devices hosting an application to communicate and control the hearing assistance devices 150 in the network. Any two of the number of electronic devices can be the computationally poor target system and the computationally rich primary system of the distributed speech-training system. The network environment has a communications network. The network can include one or more networks selected from a body area network ("BAN"), a wireless body area network ("WBAN"), a personal area network ("PAN"), a wireless personal area network ("WPAN"), an ultrasound network ("USN"), an optical network, a cellular network, the Internet, a Local Area Network (LAN), a Wide Area Network (WAN), a satellite network, a fiber network, a cable network, or a combination thereof. In some embodiments, the communications network is the BAN, WBAN, PAN, WPAN, or USN. As shown, there can be many server computing systems and many client computing systems connected to each other via the communications network. However, it should be appreciated that, for example, a single server computing system such the primary system can also be unilaterally or bilaterally connected to a single client computing system such as the target system in the distributed speech-training system. As such, FIG. 5 illustrates any combination of server computing systems and client computing systems connected to each other via the communications network.

The wireless interface of the target system can include hardware, software, or a combination thereof for communication via Bluetooth®, Bluetooth® low energy or Bluetooth® SMART, Zigbee, UWB or any other means of wireless communications such as optical, audio or ultrasound.

The communications network can connect one or more server computing systems selected from at least a first server computing system and a second server computing system to each other and to at least one or more client computing systems as well. The server computing systems and can respectively optionally include organized data structures such as databases. Each of the one or more server computing systems can have one or more virtual server computing systems, and multiple virtual server computing systems can be implemented by design. Each of the one or more server computing systems can have one or more firewalls to protect data integrity.

The at least one or more client computing systems can be selected from a first mobile computing device (e.g., smartphone with an Android-based operating system) with the application 100, a second mobile computing device (e.g., smartphone with an iOS-based operating system) with the application 100, a first wearable electronic device (e.g., a smartwatch) with the application 100, a first portable computer (e.g., laptop computer) with the application 100, a third mobile computing device or second portable computer (e.g., tablet with an Android- or iOS-based operating system) with the application 100, and hearing assistance devices 150, a wireless charger 190, and the like. Each of the one or more client computing systems can have one or more firewalls to protect data integrity. The wireless charger 190 communicates and cooperates with the hearing assistance devices 150.

Any one or more of the server computing systems can be a cloud provider. A cloud provider can install and operate application software in a cloud (e.g., the network such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources.

In some embodiments, software used to facilitate algorithms discussed herein can be embodied onto a non-transitory machine-readable medium. A machine-readable medium includes any mechanism that stores information in a form readable by a machine (e.g., a computer). For example, a non-transitory machine-readable medium can include read only memory (ROM); random access memory (RAM); magnetic disk storage media; optical storage media; flash memory devices; Digital Versatile Disc (DVD's), EPROMs, EEPROMs, FLASH memory, magnetic or optical cards, or any type of media suitable for storing electronic instructions.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C++, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both. A module can be implemented by software that contain patterns of instructions stored in a memory and executed by one or more processors, electronic circuits, and any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures can be made from the foregoing design and embodiments without departing from the scope afforded by the following claims, which scope is only limited by the claims when appropriately construed.

What is claimed is:

1. A wireless charger for a hearing assistance device, comprising:
   a microphone configured to receive a wireless communication, including data, in an audio frequency range from a speaker built into a hearing assistance device, where the hearing assistance device is configured to amplify sound into a user's ear, and
   a wireless charging circuit of the wireless charger configured to act as a wireless data transmitter to transmit wireless data in an ultrasonic frequency range, via a charging coil, to the hearing assistance device.

2. The apparatus of claim 1, where the wireless charging circuit of the wireless charger is configured to generate and send the wireless data in the ultrasonic frequency range, including sending firmware updates, as well as the microphone is configured to receive data from the speaker built into the hearing assistance device, which eliminates a need to have an external electrical contact on an exterior of the hearing assistance device to transfer the data or the firmware updates.

3. The apparatus of claim 1, where a housing of the wireless charger is used to store the hearing assistance device when the hearing assistance device is not in use as well as the housing is configured to contain the charging coil.

4. The apparatus of claim 1, where the wireless charging circuit of the wireless charger is configured to generate and send a wireless charging signal in the ultrasonic frequency band, to be the wireless source of power, to charge rechargeable batteries of the hearing assistance device as well as ii) the wireless data transmitter for the wireless data in the same ultrasonic frequency range as the wireless charging signal.

5. The apparatus of claim 1, where the wireless charger is equipped with a microprocessor, which is connected to an oscillator and a digital-to-analog converter to control a frequency and an amplitude of a charging signal, where the charging signal, via amplitude modulation, is used as a carrier wave for the wireless data transmission in the ultrasonic frequency range.

6. The apparatus of claim 1, where a microprocessor in the wireless charger is configured to connect to an oscillator, which is a same oscillator that the wireless charger uses to transfer power, where the oscillator is also configured to connect to an amplifier that the wireless charger uses to drive the charging coil to be a wireless source of power as well as a carrier wave for the wireless data transmission to the hearing assistance device.

7. The apparatus of claim 1, where the hearing assistance device is configured to communicate the wireless communication, including data with metrics to the microphone in the wireless charger in the audio frequency band through its speaker that is collected by the hearing assistance device, where the wireless charger has a Wi-Fi communication circuit to report the data including the metrics from the hearing assistance device via Wi-Fi over a wide area network to a cloud platform.

8. The apparatus of claim 1, where a modulator in the wireless charger is configured to use a unique starting pattern before the wireless transmission of the wireless data to prevent environmental noise in the ultrasonic frequency range from being interpreted as the wireless data.

9. The apparatus of claim 8, where the wireless charger, after transmission of the unique starting pattern, is configured to transmit firmware for a signal processor in the hearing assistance device while the hearing assistance device is in operation and being stored in a housing of the wireless charger.

10. The apparatus of claim 1, where a demodulator is in an input signal path of a different wireless charging circuit located in the hearing assistance device, where an input of a charging chip is tied to the demodulator, which is configured to reconstruct a universal asynchronous receiver transmitter signal.

11. A method for a wireless charger for a hearing assistance device, comprising:
    receiving a wireless communication, including data, in an audio frequency range through a microphone transmitted from a speaker built into a hearing assistance device, where the hearing assistance device is configured to amplify sound to a user's ear, and
    transmitting wireless data in an ultrasonic frequency range, via a charging coil in a wireless charging circuit of the wireless charger, to the hearing assistance device.

12. The method of claim 11, further comprising:
    generating and sending the wireless data in the ultrasonic frequency range, including sending firmware updates, from the wireless charging circuit of the wireless charger, as well as
    receiving data from the speaker built into the hearing assistance device, which eliminates a need to have an external electrical contact on an exterior of the hearing assistance device.

13. The method of claim 11, further comprising:
    storing the hearing assistance device when the hearing assistance device is not in use in a housing of the wireless charger.

14. The method of claim 11, further comprising:
    i) generating and sending a wireless charging signal in the ultrasonic frequency band, to be the wireless source of power, to charge rechargeable batteries of the hearing assistance device with the wireless charging circuit of the wireless charger, as well as
    ii) transmitting the wireless data in the same ultrasonic frequency range as the wireless charging signal with the wireless charging circuit.

15. The method of claim 11, further comprising:
    using a microprocessor, which is connected to an oscillator and a digital-to-analog converter to control a frequency and an amplitude of a charging signal, where the charging signal, via amplitude modulation, is used as a carrier wave for the wireless data transmission in the ultrasonic frequency range.

16. The method of claim 11, further comprising:
    using a microprocessor in the wireless charger to connect to an oscillator, which is a same oscillator that the wireless charger uses to transfer power, where the oscillator is also configured to connect to an amplifier that the wireless charger uses to drive the charging coil to be a wireless source of power as well as a carrier wave for the wireless data transmission to the hearing assistance device.

17. The method of claim 11, further comprising:
    communicating the wireless communication, including data with metrics to the microphone in the wireless charger in the audio frequency band through its speaker that is collected by the hearing assistance device, where the wireless charger has a Wi-Fi communication circuit to report the data including the metrics from the hearing assistance device via Wi-Fi over a wide area network to a cloud platform.

18. The method of claim 11, further comprising:

using a unique starting pattern, with a modulator in the wireless charger, before the wireless transmission of the wireless data to prevent environmental noise in the ultrasonic frequency range from being interpreted as the wireless data.

19. The method of claim 18, further comprising:

transmitting firmware for a signal processor in the hearing assistance device as the wireless data, and transmitting the firmware for the signal processor in the hearing assistance device from the wireless charger, after transmission of the unique starting pattern, 1) during charging, after the hearing assistance device is in operation, 2) while the hearing assistance device is in operation and installed in a user's ear, 3) while the hearing assistance device is in operation and being stored in a housing of the wireless charger, and 4) any combination of these.

20. The method of claim 11, further comprising:

using a demodulator in an input signal path of a different wireless charging circuit located in the hearing assistance device, where an input of a charging chip is tied to the demodulator, which is configured to reconstruct a universal asynchronous receiver transmitter signal.

* * * * *